(12) United States Patent
Ditto

(10) Patent No.: US 6,603,561 B2
(45) Date of Patent: Aug. 5, 2003

(54) CHROMATIC DIFFRACTION RANGE FINDER

(76) Inventor: Thomas D. Ditto, P.O. Box 83, Ancramdale, NY (US) 12503

( * ) Notice: Subject to any disclaimer, the term of this patent is extended or adjusted under 35 U.S.C. 154(b) by 0 days.

(21) Appl. No.: 10/079,079

(22) Filed: Feb. 20, 2002

(65) Prior Publication Data

US 2002/0149762 A1 Oct. 17, 2002

Related U.S. Application Data

(60) Provisional application No. 60/269,943, filed on Feb. 20, 2001, provisional application No. 60/297,320, filed on Jun. 11, 2001, and provisional application No. 60/315,531, filed on Aug. 30, 2001.

(51) Int. Cl.[7] ............... G01B 9/02; G01B 11/02; G01B 11/24; G01B 11/30
(52) U.S. Cl. ............ 356/486; 356/498; 356/601
(58) Field of Search ............... 356/5.09, 328, 356/331, 486, 498, 499, 601

(56) References Cited

U.S. PATENT DOCUMENTS

| | | | |
|---|---|---|---|
| 3,208,412 A | * 9/1965 | Crookston et al. | 110/340 |
| 4,678,324 A | 7/1987 | De Witt | |
| 4,864,395 A | 9/1989 | Tajima | |
| 5,076,698 A | 12/1991 | Smith et al. | |
| 5,157,487 A | 10/1992 | Tajima | |
| 5,200,792 A | 4/1993 | Tajima et al. | |
| 5,633,721 A | * 5/1997 | Mizutani | 356/401 |
| 5,675,407 A | 10/1997 | Geng | |
| 5,909,283 A | * 6/1999 | Eselun | 356/499 |
| 6,028,672 A | 2/2000 | Geng | |
| 6,147,760 A | 11/2000 | Geng | |

FOREIGN PATENT DOCUMENTS

CA 2277211 9/1999

OTHER PUBLICATIONS

Moly: A Prototype Handheld Three–Dimensional Digitizer with Diffraction Optics, Ditto et al., 2000 Society of Photo–Optical Instrumentation Engineers, vol. 39, No. 1, pp. 69–78.
Pantomation—A System for Position Tracking, Tom DeWitt et al., *Proceedings of the Second Symposium on Small Computers in the Arts*, 1982, IEEE Computer Society, No. 455, pp. 61–70.
A Range Finding Method Using Diffraction Gratings, Thomas D. DeWitt et al., *Applied Optics*, May 10, 1995, vol. 34 No. 14, pp. 2510–2521.

* cited by examiner

Primary Examiner—Thomas H. Tarcza
Assistant Examiner—Brian Andrea
(74) Attorney, Agent, or Firm—Schmeiser, Olsen & Watts

(57) ABSTRACT

A method and system for determining range by correlating a relationship between one or more distances of a diffraction grating from an illuminated target surface with variations in the respective wavelengths of high order diffraction spectra. The high order diffraction spectra are observed through the diffraction grating. The high order diffraction spectra are derived from broadband radiation transmitted from the illuminated target surface.

14 Claims, 7 Drawing Sheets

(2 of 7 Drawing Sheet(s) Filed in Color)

CHROMATIC DIFFRACTION RANGE FINDER

RELATED APPLICATION

The present invention claims priority to: U.S. Provisional Application No. 60/269,943, filed on Feb. 20, 2001; U.S. Provisional Application No. 60/297,320, filed on Jun. 11, 2001; and U.S. Provisional Application 60/315,531, filed on Aug. 30, 2001, each of which is entirely incorporated herein by reference.

BACKGROUND OF THE INVENTION

1. Technical Field

The present invention relates to a method of making measurements in three-dimensions using the chromatic dispersion of a diffraction grating.

2. Related Art

Diffraction range finders are devices which determine distance by correlating the relationship between the distances of a diffraction grating from an illuminated target surface with the respective relative displacements of high-order diffraction images from the position of the respective zero-order image as observed through the diffraction grating. The target must be self-illuminated or illuminated by a secondary source of energy propagated by periodic waves. Higher-order diffraction images of a target are reconstructed at a receiver which has a means to focus the radiation onto a transducer that can sense the position of the higher-order diffraction images. As a target is moved toward or away from a grating surface, the relative displacement of a higher-order image from both the zero-order image and other higher-orders images can be measured to take target range.

Chromatic dispersion has previously been used within structured illumination projectors to light a surface being ranged through a triangulation or parallax method.

The "Rainbow Range Finder" and its principles of operation are discussed U.S. Pat. Nos. 4,864,395; 5,200,792; and 5,157,487. Zheng Jason Geng holds U.S. Pat. Nos. 5,675,407; 6,028,672; and 6,147,760 for related inventions.

Rainbow range finders take range readings by projection of a pattern of colors onto a target and then taking the further step of correlating the colors on the target with the distances to a receiver that can discriminate the colors. All published embodiments of rainbow range finder presume a structured illumination source that projects a pattern of unique color hues onto a target surface. Typically, a rainbow projector will have a diffraction grating inside the projector that coverts the radiation from an incandescent light bulb into a broad spectrum. Said spectrum is then focused onto a target surface. The receiver can be an ordinary color video camera that has separate sensors for red, green and blue, as is typical of most television cameras. As asserted in these patents, there are well understood techniques of colorimetry for making determinations of a unique color at each pixel site in the camera by measuring the relative intensity of the primary colors. The present inventor has demonstrated such a method for such color discrimination using television cameras with red, green and blue channels ("Pantomation—A System for Position Tracking," Tom DeWitt and Phil Edelstein, *Proceedings of the Second Symposium on Small Computers in the Arts,* 1982, IEEE Computer Society, No. 455, pp. 61–70).

The Rainbow Range Finder relies on triangulation to make range measurements and therefore suffers from the intrinsic limitations of a parallax-based range finder. Among these limitations are perspective foreshortening which results in an inverse square relationship of accuracy to distance. Triangulation also suffers from the liability that occluded regions can occur between the projector and receiver causing obscured regions devoid of readings. Furthermore, as applied to profilometry, all triangulation devices make a trade-off between target height and depth sensitivity.

The limitations endemic to triangulation ranging methods as found, for example, in the Rainbow Range Finder led to the development of an improved method of range finding that uses a diffraction grating in the receiver.

Patents that teach how a range finder can be made with diffraction gratings are:

U.S. Pat. No. 4,678,324 awarded to Tom DeWitt (now known as Tom Ditto, the inventor of the present invention) on Jul. 7, 1987 for "Range Finding by Diffraction."

U.S. Pat. No. 5,076,698 granted to Smith et al. on Dec. 31, 1991 for "Sensing the Shape of an Object."

PCT/US1997/02384, priority date Dec. 30, 1996, laid open as WIPO WO1999/044013 and published as Canadian Patent Application CA2277211, "VARIABLE PITCH GRATING FOR DIFFRACTION RANGE FINDING SYSTEM," inventors Ditto and Lyon.

The '324 patent supra teaches "It has been found that the objects of the present invention may be realized by projecting a monochromatic pencil beam of light at a target, viewing the illuminated target through a diffraction grating, and measuring the displacement of the higher order diffraction images from the position of the zero order image lines," [column 4, lines 56–61].

In FIG. 1, adapted from Thomas D. DeWitt and Douglas A. Lyon, "A Range Finding Method Using Diffraction Gratings," *Applied Optics,* May 10, 1995, Vol. 34 No. 14, pp. 2510–2521, the authors describe a mathematical relationship in the diffraction range finder whereby range can be determined by measuring the displacement x 104 of a higher-order diffraction image formed at the focal plane of a camera 130. The displacement x 104 is measured with respect to point 107 located at the center of the focal plane of the camera 130. The distance D 100 from the target 150 to grating 120 can be measured along a line of light from a laser 110. The relationships of a diffraction range finder be described geometrically as:

$$D = \frac{\left(\frac{\sqrt{1-\left(n\frac{\lambda}{p}-\sin\left(\rho+\arctan\left(\frac{x}{F}\right)\right)\right)^2}}{n\frac{\lambda}{p}-\sin\left(\rho+\arctan\left(\frac{x}{F}\right)\right)}\right)\left(d\tan\left(\rho+\arctan\left(\frac{x}{F}\right)\right)-s\right)}{\cos(\alpha)-\left(\frac{\sqrt{1-\left(n\frac{\lambda}{p}-\sin\left(\rho+\arctan\left(\frac{x}{F}\right)\right)\right)^2}}{n\frac{\lambda}{p}-\sin\left(\rho+\arctan\left(\frac{x}{F}\right)\right)}\right)-\sin(\alpha)} \quad (1)$$

In relation to FIG. 1 and Equation (1), a laser 110 transmits monochromatic light to a target 150 along a line of illumination 115. The target 150 redirects said light to a diffraction grating 120, and the diffraction grating 120 diffracts said light into a diffraction pattern. The diffraction pattern is passed through a lens 140 of a camera 130 and is recorded on a focal plane of the camera 130. Other parameters appearing in FIG. 1 and Equation (1) are as follows:

D 100 is the range along the line of illumination 115 from the target 150 to the diffraction grating 120.

d 101 is the distance from the lens 140 to the diffraction grating 120.

s 102 is the distance from the lens 140 to the line 117, wherein the line 117 is normal to grating plane of the grating 120 and passes through the intersection 118 of the illumination ray 115 with the grating plane.

n is an integer denoting the diffraction order (n=0 denotes zero-order diffraction, while n>0 and n<0 denotes high order diffraction)

$\lambda$ is the wavelength of the light transmitted by the laser 110.

p is the pitch of the grating 120.

F 103 is the focal length of the lens 140.

x 104 is the position on the focal plane where the diffraction image forms.

$\alpha$ 105 is the angle of a laser relative the line 117.

$\rho$ 106 is the angle of the baseline of the camera 130 relative to the line 117.

An example of the related art is shown in FIG. 2. A step block 230 is a target that is illuminated by a laser 210. The laser 210 produces a sheet of monochromatic light 220. On the target 230 surface, the sheet of light 220 is diffused as wave fronts 222 back toward a diffraction grating 240. Examples of diffused light rays are shown as 224 and 225. The light diffused from the target 230 strikes the grating 240 which is in the field-of-view of a monochrome camera 250 with array sensor 255. Examples of diffracted rays are shown as extensions of rays 224 and 225. If the camera signal is viewed on a television monitor 255, it will show points 257 of horizontal displacement across the screen proportional to target range. The correlated positions on the monitor of example rays 224 and 225 are indicated.

In WO1999/044013 supra, a method is taught of varying the grating pitch p across the face of the grating so as to control the displacement x as a function of target distance D as per the embodiment of FIG. 2. A prototype embodiment of the variable pitch diffraction range finder is fully disclosed in: Tom Ditto and Douglas A. Lyon, "Moly a prototype handheld three-dimensional digitizer with diffraction optics," *Optical Engineering*, January 2000, Vol. 39 No. 1, pp. 68–78.

In all of these prior disclosures describing diffraction range finders, the measured variable has been the displacement of a monochromatic higher-order diffraction image as a function of target range. The related as disclosed supra herein, has several drawbacks.

One drawback is the rate of acquisition. Receivers used in diffraction profilometry instruments measure relative displacements on a camera focal plane between a zero-order image and higher-order images, but the region between diffraction orders contains no illumination. A raster order scan through the dark pixels that occupy space between the sparsely distributed illuminated pixels can account for up to 99% of scan time. The diffraction range finder profilometer reported by the inventor to the National Science Foundation (DMI-9420321) has a theoretical maximum acquisition rate of 15 thousand points a second. This compares poorly with contemporary two-dimensional video cameras that routinely capture 15 million points per second.

A second limitation in the prior art of diffraction range finders is the accuracy of the acquired data. Typical receivers used in prototype diffraction range finders, such as video cameras, have less than 10 bits of resolution of spatial resolution. Even the most expensive grades of two-dimensional video cameras achieve less than 12 bits of spatial resolution in any one dimension. These limits in accuracy are then imposed on the diffraction range finder's measurements of distance.

Another weakness in diffraction range finders of the related art is that those range finders made with plane gratings of fixed grating pitch suffer loss of resolution with target distance. Just as perspective foreshortening makes objects appear shorter as they recede into the distance, so the higher-order diffraction images made with plane gratings shift less on the focal plane as the measured range increases. There is an inverse square loss of resolution with distance.

Another difficulty in diffraction range finder manufacture is the considerable size of the grating, which contributes to the competitive cost of the instrument while adversely affecting instrument size and thereby user convenience.

An additional problem in prior diffraction range finders design is the use of a laser as the source of structured illumination. Coherent laser radiation can be a hazard to the eye and is strictly regulated by governments. Incoherent light does not pose this problem.

Thus, there is a need for a range finder that overcomes the limitations described above.

SUMMARY OF THE INVENTION

A first objective of the present invention is to make diffraction range finders that work under polychromatic incoherent illumination.

A second object of the present invention to increase the rate of acquisition of diffraction range finder.

A third object of the present invention is to minimize the occlusion liability of the range finder.

A fourth object of the present invention to provide structured illumination from a source that presents no hazard to the eye.

A fifth object of the present invention is to improve the accuracy of a diffraction range finder; and furthermore to overcome an inverse square relationship of resolution to accuracy.

A sixth object of the present invention to lower the cost of a diffraction range finder.

A seventh object of the present invention is to miniaturize the instrument.

Objectives and advantages of the present invention have been set forth in part above and will be obvious in part from, or learned by practice with, the invention. The invention consists in the parts, constructions, embodiments and combinations, herein shown and described, or as may be inferred by reading this document.

The present invention provides a method for determining range by correlating a relationship between one or more distances of a diffraction grating from an illuminated target surface with variations in the respective wavelengths of high order diffraction spectra as observed through said grating, said high order diffraction spectra being derived from broadband radiation transmitted from said illuminated target surface.

The present invention overcomes the limitations of the related art described supra.

BRIEF DESCRIPTION OF THE DRAWINGS

The fileof this patent contains at least one drawing executed in color.

The objects, features and advantages of the present invention and its application will be more readily appreciated when read in conjunction with the accompanying drawings.

The file of this patent contains at least one drawing executed in color. Copies of this patent with color drawing (s) will be provided by the Patent and Trademark Office upon request and payment of the necessary fees.

DETAILED DESCRIPTION OF THE INVENTION

The objects of the present invention may be realized by recording the wavelengths within the spectrum of wavelengths dispersed by a diffraction grating as the measured variable when finding range by the diffraction method.

Figure 2:
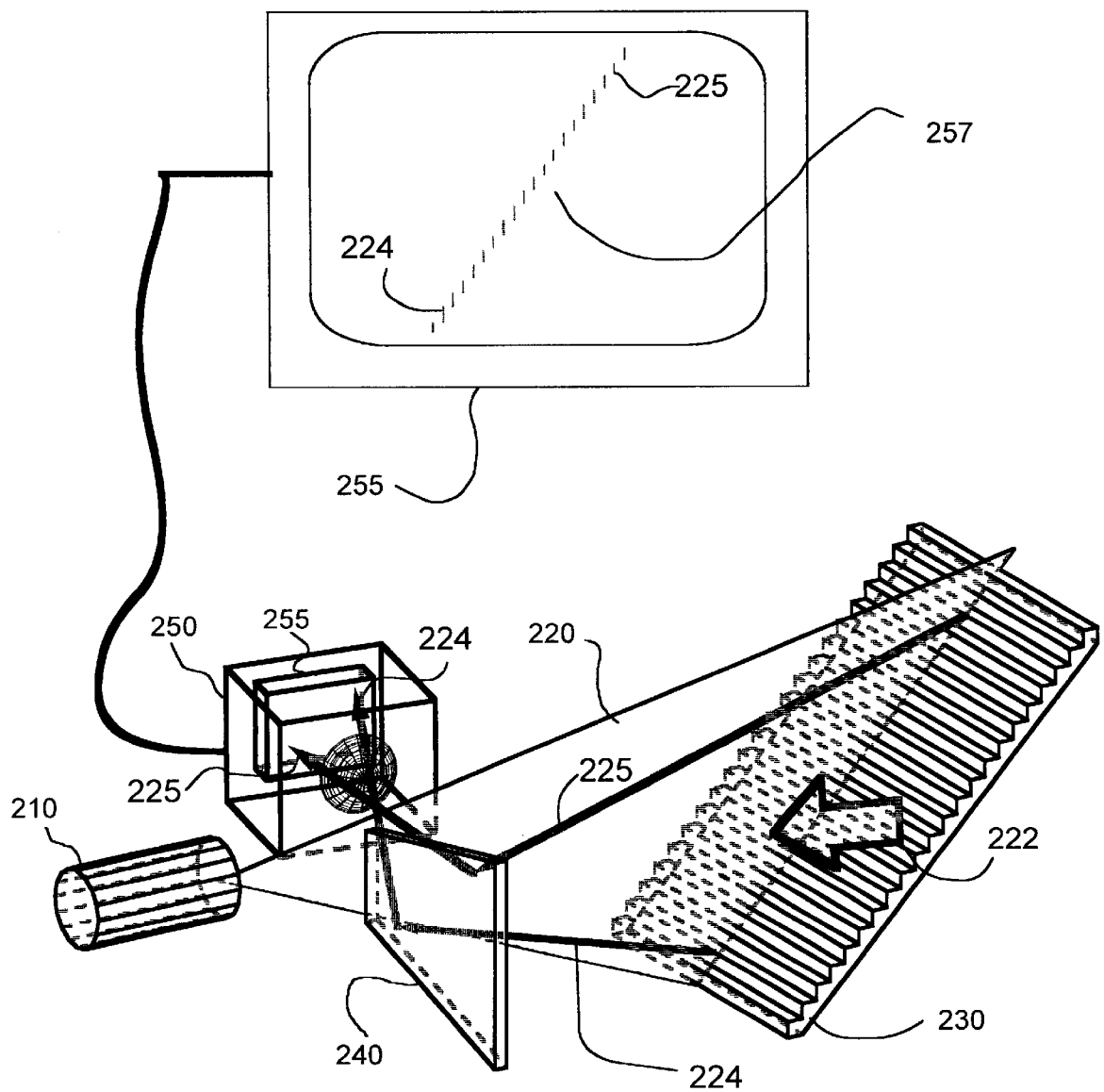
FIG. 2 shows an embodiment of a diffraction range finder of the related art.
Figure 3:
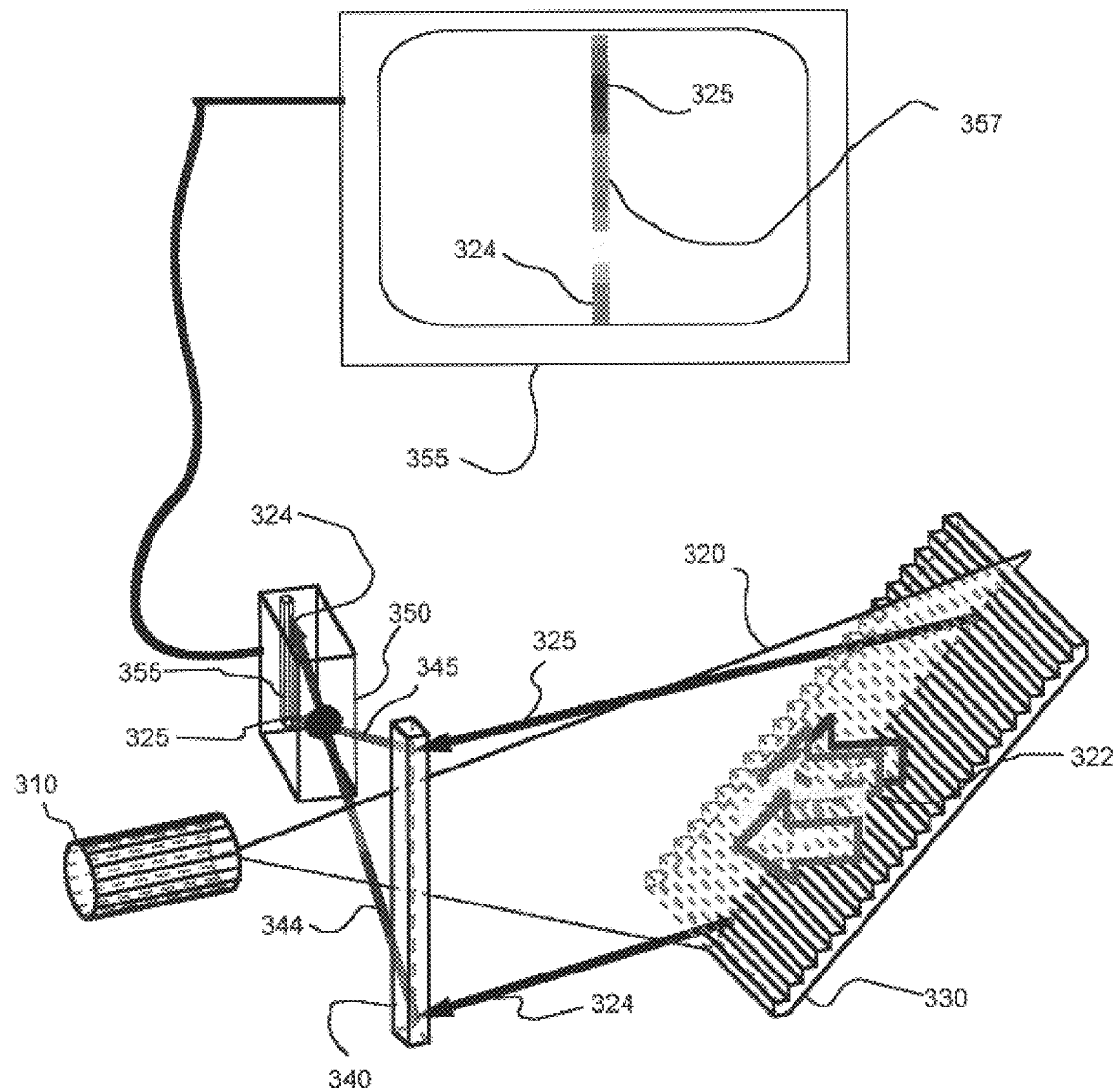
FIG. 3 is a diagram in a color reproduction showing the improvements of a polychromatic projector and a thin diffraction grating with the resulting chromatic image, in accordance with embodiments of the present invention.

In FIG. 3, the monochromatic laser 210 of the related art shown in FIG. 2 is replaced with a projector 310 that radiates a sheet of polychromatic light 320, in accordance with the present invention. The projector 310 serves as external source that illuminates a target 330 with the polychromatic light 320. Alternatively, the target 330 could be an original source of said polychromatic light 320. The polychromatic light 320 comprises broadband radiation such as, inter alia, broadband electromagnetic radiation for any wavelength range (e.g., the visible or X-ray wavelengths of electromagnetic radiation). When the polychromatic light strikes the target 330 surface, the target 330 diffuses a broad spectrum 322 of the polychromatic light toward a diffraction grating 340. Although FIG. 3 shows the grating 340 as a reflection diffraction grating, the grating 340 may alternatively be a transmission diffraction grating.

Examples of rays of the polychromatic light from the target 330 to the grating 340 are indicated as arrows 324 and 325. The requisite diffraction grating needed to make the range reading can be a thin grating strip 340 rather than a grating of considerable width such as the grating 240 (see FIG. 2) employed in the related art. The target 330 falls within the plane of a sheet of light generated by the projector 310. The grating 340 diffracts the incident polychromatic light into a spectrum of wavelengths. For example, different wavelengths of radiation are directed along paths 344 and 345.

In FIG. 3, a camera 350 must be capable of discriminating the different wavelengths of incident energy, such as the different wavelengths along paths 344 and 345. In this way, the camera 350 of the present invention differs from the monochromatic cameras used in the related art. However, cameras suitable for use in the present invention, such as those having independent red, green and blue channels, are commonly employed in the practice of image recording. The process of correlating the relative levels of intensity of red, green and blue channels with specific wavelengths of light is known as colorimetry and is widely practiced in the such fields as color photography and color printing. Generally, the camera 350 embodies any applicable recording medium. For example, the recording medium in FIG. 7 is the focal plane of the camera 350.

As illustrated in monitor 355 of FIG. 3, the data being recorded can be displayed as a thin strip 357. The rays 324 and 325 are displayed as different colors 324 and 325 on monitor 355. A two-dimensional sensor, as is required for the prior art to produce the horizontal and vertical displacements associated with points 257 of FIG. 2 is not required for practice of the present invention. Instead a sensor (e.g., camera) 350 may have a linear array sensor 355 such as those commonly used in color desktop scanners. Linear sensors are less expensive, more sensitive and have higher spatial resolution along their single extended dimension than two-dimensional sensors. Hence, the present invention achieves lower cost and superior performance over the related art which uses a two dimensional sensor. Moreover, as grating strip 340 has a waist no wider than is needed to report colors to the linear sensor 350, the grating cost is decreased by orders of magnitude over gratings of considerable width as used in the related art.

Figure 1:
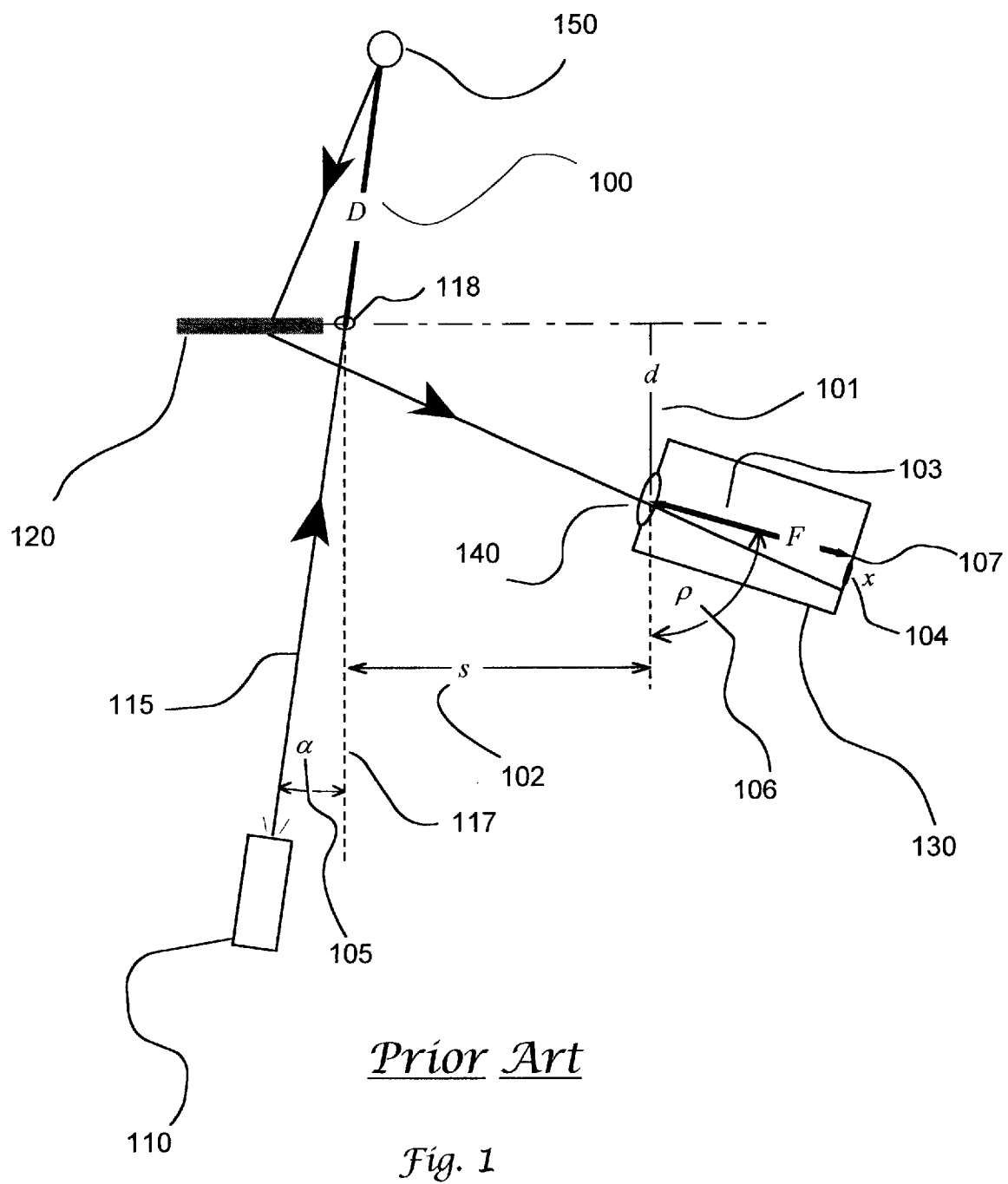
FIG. 1 is a diagram showing the parameters and relationships in an embodiment of a diffraction range finder of the related art.

Under the simplifying condition of using a linear array sensor, the measured variable of Equation (1), namely x (see FIG. 1), can be set to zero. As a result, the embodiment of FIG. 3 determines the range from variations in $\lambda$, the wave length reaching the sensor 350 from the grating 340. If x=0, Equation (1) becomes:

$$D = \frac{\left(\frac{\sqrt{1 - \left(n\frac{\lambda}{p} - \sin(\rho)\right)^2}}{n\frac{\lambda}{p} - \sin(\rho)}\right)((d\tan(\rho)) - s)}{\cos(\alpha) - \left(\frac{\sqrt{1 - \left(n\frac{\lambda}{p} - \sin(\rho)\right)^2}}{n\frac{\lambda}{p} - \sin(\rho)}\right) - \sin(\alpha)} \quad (2)$$

Figure 4:
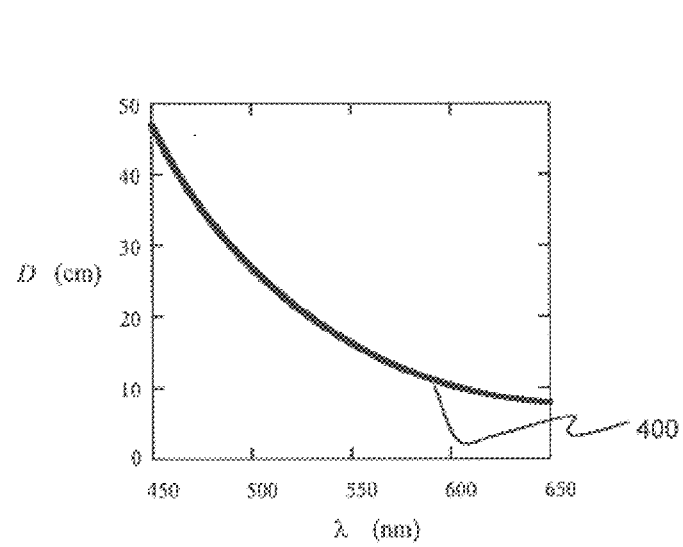
FIG. 4 is a graph of the relationship between target distance and wave length as per the embodiments of FIG. 3, in accordance with embodiments of the present invention.

Using Equation (2), FIG. 4 correlates the target range D to $\lambda$ as embodied in the color measured, in accordance with embodiments of the present invention. This relationship is illustrated by the example of trace 400. The specific calculation of D producing trace 400 is taken from conditions illustrated in FIG. 3 and is calculated using the relationships in Equation (2). The model assumes a grating of a pitch (p) of 400 nm, a lens having a focal length F of 20 mm on a camera set near grazing incidence, an angle $\rho$ of 80° relative to the grating plane normal. The lens is placed at distances from the grating to the lens of 1 cm for both s and d. The sheet of light is projected in the direction perpendicular to the grating plane making angle $\alpha$ equal to zero. See FIG. 1 and accompanying discussion for definitions of p, $\rho$, s, d, and $\alpha$.

The consequences of using wavelength $\lambda$ as the measured variable go beyond the beneficial features in the apparatus illustrated in FIG. 3. The chromatic method can be used to make measurements that are not possible with the related art. For example, the chromatic diffraction range finder can conveniently take measurements for determining both the range and displacement of a moving beacon as will be explained next in conjunction with FIG. 5.

Figure 5:
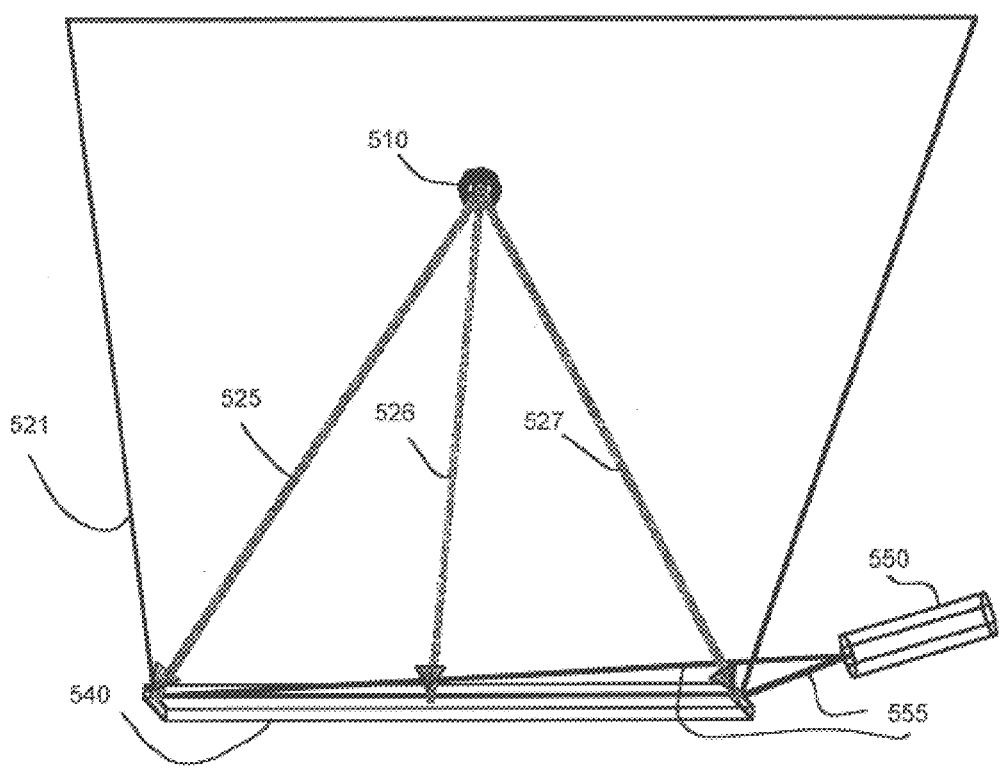
FIG. 5 pictorially shows a white light emitter, a thin diffraction grating and a linear photo sensor with the diffraction angles of three different wavelengths, in accordance with embodiments of the present invention.

As illustrated in FIG. 5, target beacon 510, a source of polychromatic illumination, can be seen within a two-dimensional acquisition window 521 by camera 550 with field-of-view 555 over grating 540, in accordance with embodiments of the present invention. Relatively longer wavelength radiation (e.g., red), is diffracted at a greater angle by the grating 540 than are relatively shorter wavelengths (e.g., blue). In FIG. 5, there are three angles of radiation indicated by way of example by the three rays 525, 526, and 527. Ray 525 could be red light relative to green light propagating along ray 526 and relative to blue light propagating along ray 527.

Figure 6A:
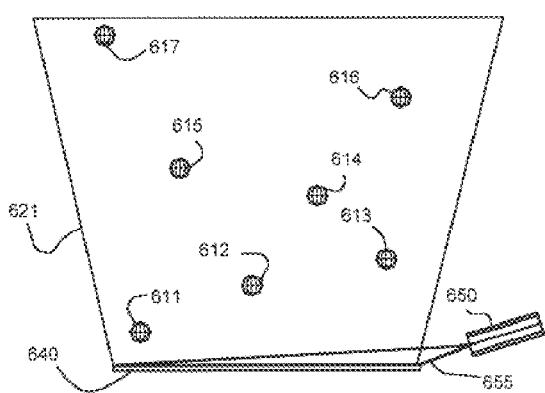
FIG. 6(a) depicts seven emitter positions at different positions in the acquired region sensed by the sensor of the range finder shown in FIG. 5, in accordance with embodiments of the present invention.
Figure 6B:
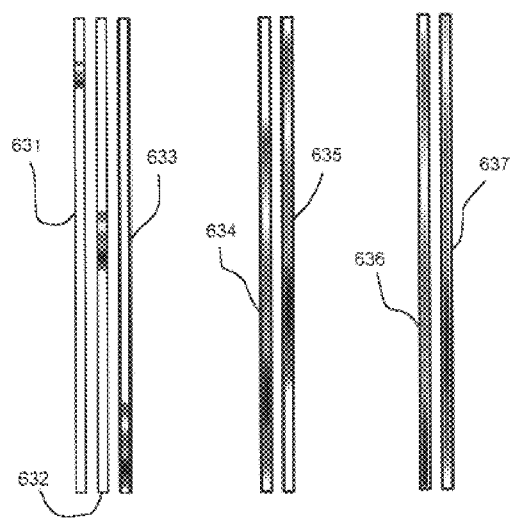
FIG. 6(b) graphically shows, in a color reproduction, the spectral images formed in the sensor from the seven positions of the emitter depicted in FIG. 6(a), in accordance with embodiments of the present invention.

A plurality of possible target beacon positions is indicated in FIG. 6(a), the nearest to the grating being beacon position 611 with alternate beacon positions 612–617 being indicated for comparison, in accordance with embodiments of the present invention. Also in accordance with embodiments of the present invention, the spectra that might be formed at sensor (e.g., camera) 650 from these beacon positions 611–617 are illustrated in the color plate FIG. 6(b) by their corresponding spectral images 631–637; i.e., spectral image 631 in FIG. 6(b) corresponds to beacon position 611 in FIG. 6(a), spectral image 632 in FIG. 6(b) corresponds to beacon position 612 in FIG. 6(a), etc. In the near-field positions 611, 612 and 613, the corresponding spectra 631, 632, and 633 are compressed and do not fill the entire field-of-view of the sensor 650. The displacements of the beacon positions are evident in the corresponding translations along the considerable length of the sensor recording. In the mid-field at positions 614 and 615, the sensor detects spectral radiation over most of its length, and the corresponding spectra 634 and 635 have expanded in comparison to 631–633. The lateral positions of selected color hues shift according to the translation of their corresponding beacons. In the far-field, as per positions 616 and 617, the sensor 650 no longer encompasses the entire spectrum, but a portion of the entire spectrum provides color hues at nearly all photo sites.

The requisite analysis for the embodiment illustrated in FIGS. 5 and 6(a) is premised on the same fundamental principle as that used for the embodiment of chromatic range finder illustrated in FIG. 3, that is, color dispersed by diffraction can be correlated with range. However, the analysis takes further steps to account for the displacement of the target along the sensor length.

For the case in which the target beacon 510 is constrained to move within the two-dimensional acquisition window 521 in FIG. 5 in only one direction (e.g., the direction described by one of the rays 525, 526, and 527 in FIG. 5), the range may be calculated by use of Equation (2). In the unconstrained case where the target beacon 510 moves freely within the two-dimensional acquisition window 521, the chromatic method of diffraction range finding further requires that the positions of at least two discrete colors be resolved at the receiver as a sufficient condition for both the distance and displacement of the target beacon 510 to be calculated. For this unconstrained case where the target beacon 510 moves freely within the two-dimensional acquisition window 521, the range may be calculated in accordance with the methodology of Equations (3)–(27), described infra.

Figure 7A:
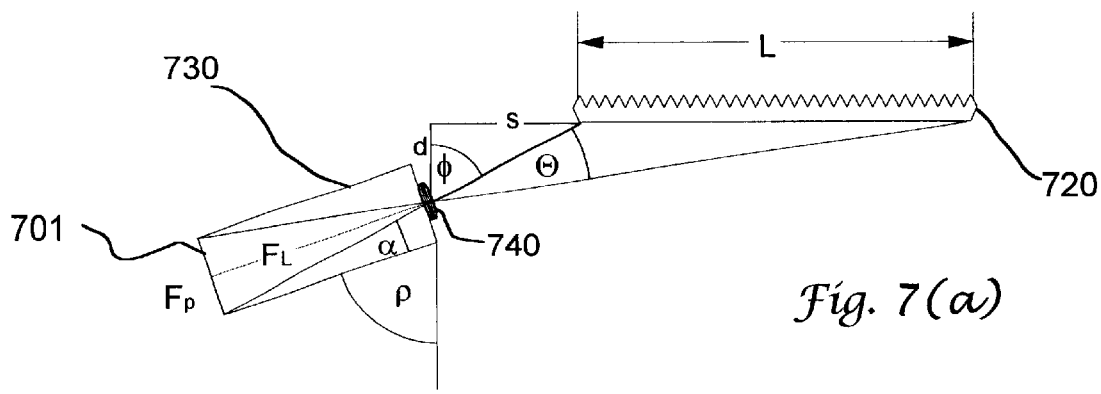
FIG. 7(a) is a diagram of a sensor and lens positioned to view a grating, in accordance with embodiments of the present invention.
Figure 7B:
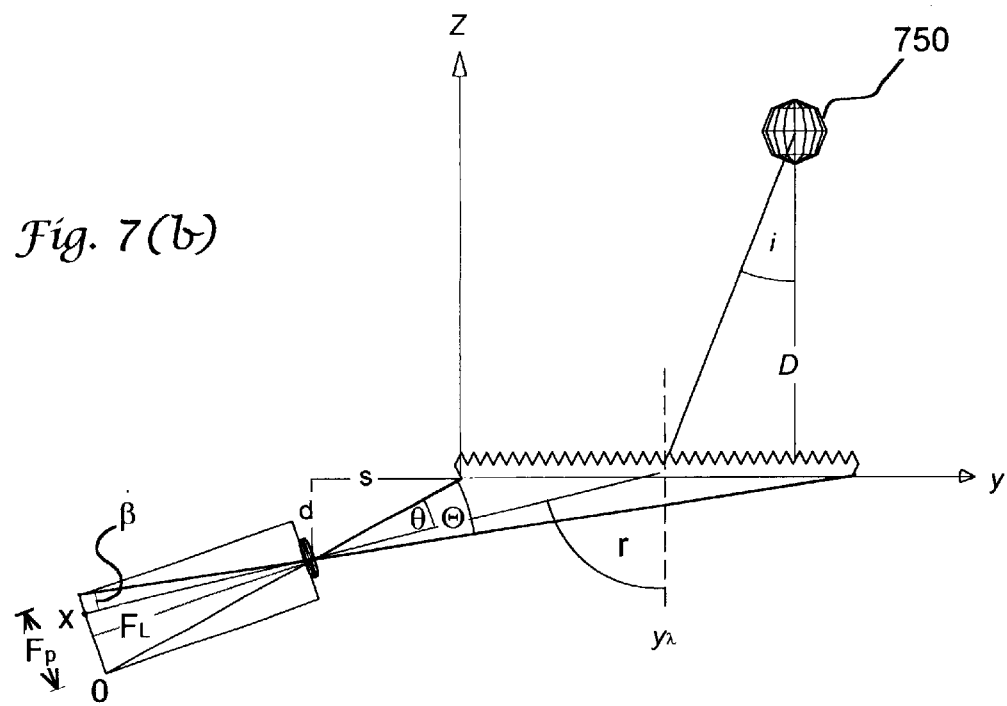
FIG. 7(b) is a diagram of a camera and grating of FIG. 7(a) positioned to acquire a target, in accordance with embodiments of the present invention.
Figure 7C:
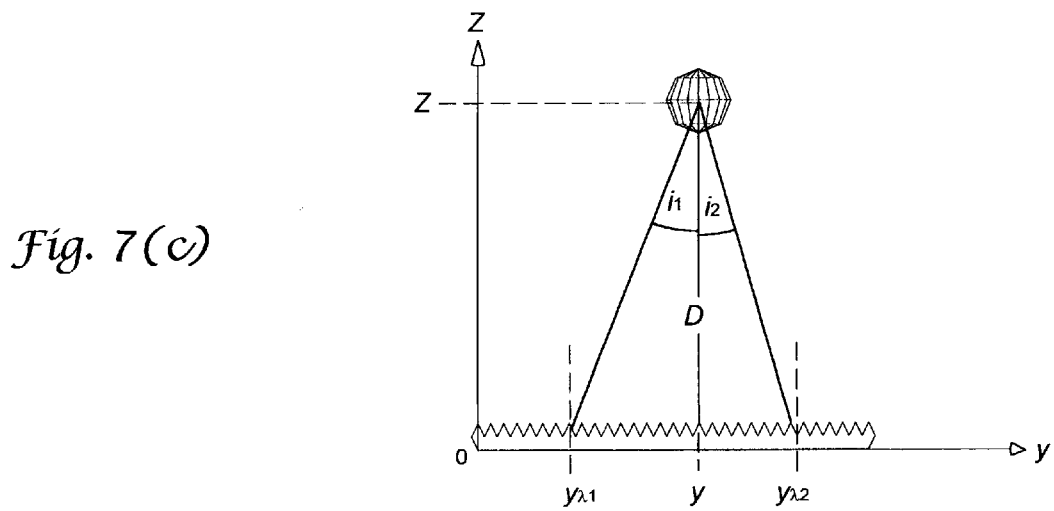
FIG. 7(c) is a diagram of the grating and target of FIG. 7(b) with two wave lengths indicated, in accordance with embodiments of the present invention.

FIGS. 7(a)–(c) are diagrams for the geometric optics used in the present analysis, in accordance with embodiments of the present invention. The embodiments of FIGS. 7(a)–(c) utilize polychromatic light transmitted from a beacon target 750 (see FIG. 7(b)), wherein said polychromatic light comprises broadband radiation such as, inter alia, broadband electromagnetic radiation for any wavelength range (e.g., the visible or X-ray wavelengths of electromagnetic radiation). The beacon target 750 could be illuminated by an external source of said polychromatic light. Alternatively, the beacon target 750 could be an original source of said polychromatic light. This analysis is for a diffraction grating 720 of considerable length L but of little appreciable width; i.e., the grating is a thin grating. The grating 720 may be a reflection diffraction grating or a transmission diffraction grating. The distance below the grating plane to a camera lens 740 is distance d. The lens has a focal length $F_L$, and the sensor (i.e., camera 730) has a line sensor array on a focal plane 701 of length $F_P$. As with the thin grating, the sensor (i.e., camera 730) is modeled to have no appreciable width. Generally, the sensor (represented as the camera 730 in FIG. 7) may include any applicable recording medium. In FIG. 7, the recording medium is the focal plane 701 of the camera 730.

To frame the grating 720 and only the grating 720, the camera 730 must be positioned at a stand-off distance s and rotated toward the grating at angle ρ. The standoff s can be calculated where d is given or, conversely, d can be calculated where s is given. It also will be shown that ρ, the sensor rotation angle, can be determined once s and d are known.

Inside the camera 730 there are triangles such that $$\frac{\frac{F_P}{2}}{F_L} = \tan\left(\frac{\Theta}{2}\right) \quad (3)$$

The field-of-view Θ afforded by the lens 740 focused at infinity is therefore $$\Theta = 2\arctan\left(\frac{1}{2}\frac{F_P}{F_L}\right) \quad (4)$$

The focal plane 701 images the grating 720 exclusively so $$\tan(\phi) = s/d \quad (5)$$

$$\tan(\phi + \Theta) = \frac{s+L}{d} \quad (6)$$

Taking advantage of the commonality of d in Equations (5) and (6):

$$\frac{s+L}{\tan(\phi+\Theta)} = \frac{s}{\tan(\phi)} \quad (7)$$

The trigonometric identity for tan(φ+Θ) gives a solution for angle φ such that $$\phi = \arctan\left[\frac{L + \sqrt{L^2 + 4s^2\tan(\Theta)^2 - 4Ls\tan(\Theta)^2}}{2s\tan(\Theta) + 2L\tan(\Theta)}\right] \quad (8)$$

Where d is a given design parameter rather than stand-off s, a similar derivation is possible using the equivalencies $$s = d\tan(\phi) \quad (9)$$

$$s = d(\tan(\phi+\Theta) - L/d) \quad (10)$$

Solving for φ:

$$\phi = \arctan\left[\frac{L\tan(\Theta) - \sqrt{\tan(\Theta)(L^2\tan(\Theta) - 4d^2\tan(\Theta) + 4dL)}}{2d\tan(\Theta)}\right] \quad (11)$$

Equations (8) and (11) for φ are stated here with their positive roots.

Knowing φ enables s or d to be computed, depending upon which of s or d is known, by use of Equation (9). Moreover, the rotation angle ρ of the camera enclosure can be determined from φ, because $$\rho = \phi + \alpha \quad (12)$$

where $$\alpha = \arctan\left(\frac{F_P}{2F_L}\right) \quad (13)$$

FIG. 7(*b*) illustrates the measurement of the displacement of a beacon target 750 along the (y, z) axes as detected at the camera 730 by the movement of the color images on the focal plane 701. The beacon target 750 is alternatively referred to herein as beacon 750 or as target 750. The position x of the image across the focal plane 701 is inscribed by angle θ. The position x denotes a distance on the focal plane 701 from an origin point O. To find θ, an inscribed angle β will first be calculated:

$$\beta = \arctan\left(\frac{\frac{F_P}{2}}{F_L}\right) - \arctan\left(\frac{x - \frac{F_P}{2}}{F_L}\right) \quad (14)$$

The angle r is the diffraction angle for the color incident at angle i.

$$\theta = \Theta - \beta \quad (15)$$

Substituting Equation (4) into Equation (15)

$$\theta = \Theta - \frac{\Theta}{2} - \arctan\left(\frac{x - \frac{F_P}{2}}{F_L}\right) \quad (16)$$

The legs opposed to angle r can be used to obtain:

$$\tan(r) = \frac{s + y_\lambda}{d} \quad (17)$$

$$y_\lambda = d(\tan(r) - s/d) \quad (18)$$

Substituting Equation (16) into Equation (18)

$$y_\lambda = d\left[\tan\left(\left(\Theta - \frac{\Theta}{2} - \arctan\left(\frac{x_\lambda - \frac{F_P}{2}}{F_L}\right)\right)\right) - \frac{s}{d}\right] \quad (19)$$

Equation (19) allows x, the measured variable for position along the linear array, to be used to locate a corresponding position $y_\lambda$ on the grating plane.

The diagram in FIG. 7(*c*) shows the target side of the grating with ray paths for two wave lengths. The Diffraction Equation states $$\sin(r) + \sin(i) = n\lambda/p \quad (20)$$

The parameter "n" in Equation (20) denotes the diffraction order. Under the constrained condition of n=1:

$$i = \arcsin(\lambda/p - \sin(r)) \quad (21)$$

The geometry in FIG. 7(b) illustrates that, for any arbitrary diffraction spectral color λ appearing along the grating plane at $y_\lambda$ there is an incident diffraction angle i at distance D (where D is the target range) such that $$\tan(i) = \frac{y - y_\lambda}{D} \quad (22)$$

From Equation (22), the solution for y for any case of $y_\lambda$ is $$y = D \tan(i) - y_\lambda \quad (23)$$

In the case of two values for $y_\lambda$ made with readings at two wave lengths $\lambda_1$ and $\lambda_2$ it follows from Equation (23) that $$D \tan(i_1) - y_{\lambda 1} = D \tan(i_2) - y_{\lambda 2} \quad (24)$$

Target range D and displacement at co-ordinate y can be found, first by finding the range D at co-ordinate y where $$D = \frac{y_{\lambda 1} - y_{\lambda 2}}{\tan(i_1) - \tan(i_2)} \quad (25)$$

With D known, the displacement y can be calculated using either Equation (26) or Equation (27):

$$y = D \tan(i_1) - y_{\lambda 1} \text{ or } y = D \tan(i_2) - y_{\lambda 2} \quad (26 \& 27)$$

The redundancy in the possible ways to calculate y and D by use of many different wave lengths $\lambda_n$ (i.e., $\lambda_1$, $\lambda_2$, $\lambda_3$, ...) allows a statistical averaging that will reduce noise in real world applications. Moreover, each wavelength has a separate path to the grating thereby providing occlusion immunity if some of the rays are interrupted by an interceding object.

In FIGS. 7(a)–7(c) and Equations (3)–(27), the position of the diffraction grating 720 relative to the target 750 is unknown, prior to calculating $y_\lambda$ via Equation (19), along a direction that is parallel to the long dimension of the diffraction grating 720 (i.e., along the direction of the y axis). This is a reason why at least two wavelengths must be used.

Figure 8:
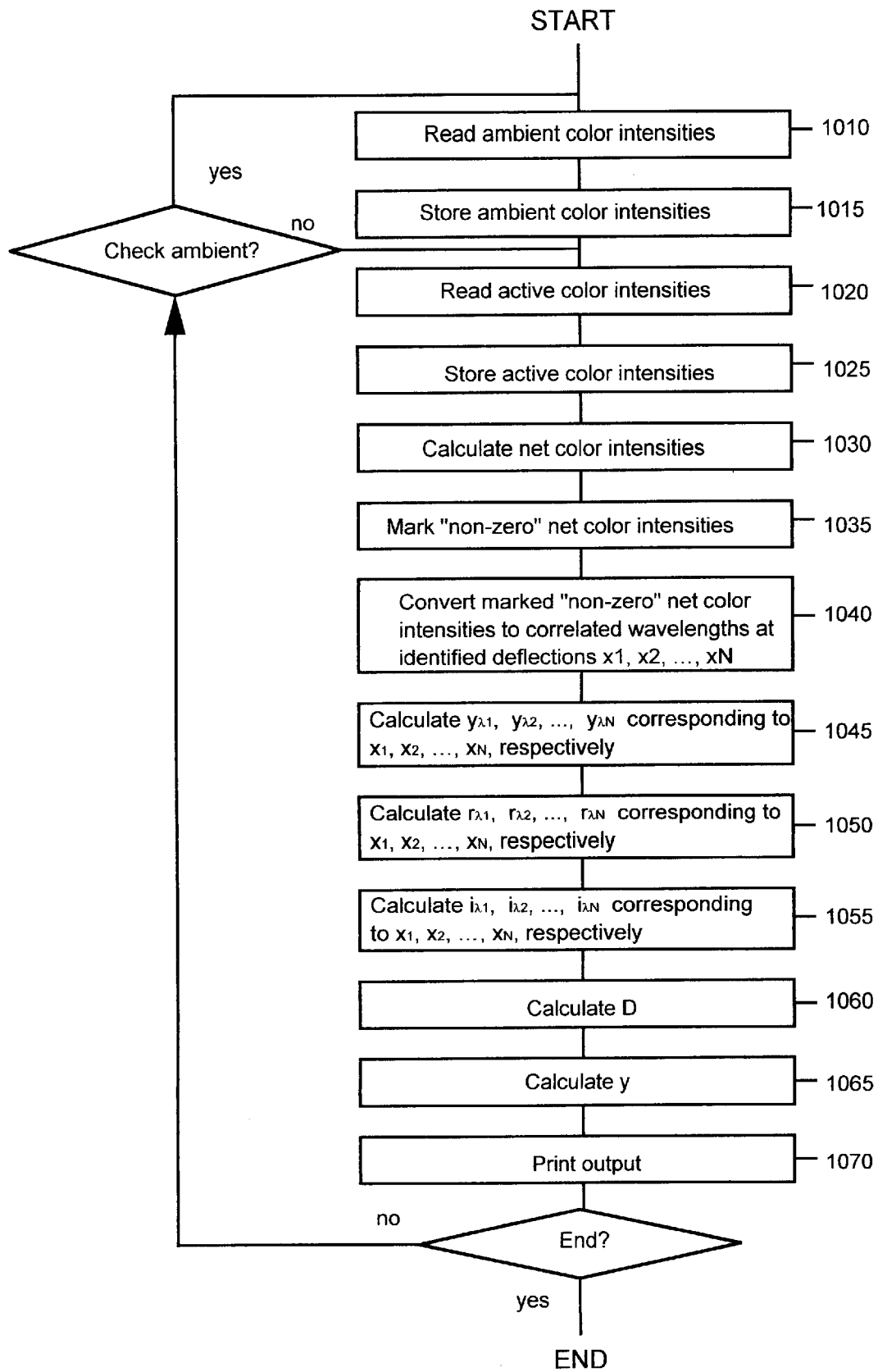
FIG. 8 is a flow chart describing steps that may be used for calculating the range in conjunction with FIGS. 7(a)–7(c) and associated equations, in accordance with embodiments of the present invention.

Equations (3)–(26) can be followed in steps to calculate the position in axes (y, z) of a beacon target. A set-up procedure, suggested by Equations (3)–(13) will establish the values of the fixed parameters such as s, d, φ, ρ, L, $F_P$ and $F_L$. Having established the fixed parameters, the range finder can dynamically calculate the range as described in the following steps of FIG. 8, in accordance with embodiments of the present invention:

Step 1010: With beacon 750 "off" take camera 730 ambient readings of color intensity for at least two colors at each identified position x over the focal plane 701. An identified position x is a position x that has been identified as a spatial location on the focal plane 701 at which color intensity readings are to be taken. Although there are an infinite number of values of x since x is a continuous variable, there are a finite number of identified positions x. At each identified position x, one color intensity reading is taken for each color sensor in the camera 730. Thus if the camera 730 has three color sensors (e.g., a red color sensor, a green color sensor, and a blue color sensor), then three color intensity readings are taken at each identified position x. Under the "off" condition, the beacon 750 is not visible and the associated camera 730 readings relate to ambient (i.e., background) radiation. Note that if the beacon 750 has a known color temperature, then its relative spectral intensities may be included within said ambient readings according to the principles of colorimetry.

Step 1015: The color intensity readings of step 1010 are stored. Note that steps 1010 and 1015 are initialization steps that are performed once and typically not repeated. In contrast steps 1020–1065, described infra are executed in a sequence and said sequence may be repeatedly executed many times, wherein each said execution of said sequence utilizes the results of the initialization steps 1010 and 1015.

Step 1020: With beacon 750 "on" take camera 730 active readings of color intensity for the same colors as in step 1 at each identified position x over the focal plane 701. Under the "on" condition, the beacon 750 is illuminated and the associated camera 730 active readings relate to radiation intended to be used for calculating the range D.

Step 1025: The color intensity readings of step 1020 are stored.

Step 1030: Calculate net color intensities at each identified position x by subtracting the color intensity readings of step 1025 from the color intensity readings of step 1015.

Step 1035: Mark net color intensities greater than zero or greater than a predetermined tolerance at each identified position x. Said pre-determined tolerance may be indicative of background noise in terms of a practical signal to noise ratio floor.

Step 1040: Convert the marked net color intensities at each identified position x to their correlated wave length λ as discussed infra. This conversion is a function of relative color sensor sensitivities to the various colors. Consider N identified position x ($x_1$, $x_2$, ..., $x_N$) such that N is at least 2 and such that $x_1$, $x_2$, ..., $x_N$ is a subset of the totality of identified position x. Let $\lambda_1$, $\lambda_2$, ..., $\lambda_N$ denote the correlated wave lengths associated with $x_1$, $x_2$, ..., $x_N$, respectively.

Step 1045: Calculate $y_{\lambda 1}$, $y_{\lambda 2}$, ..., $y_{\lambda N}$ corresponding to $x_1$, $x_2$, ..., $x_N$, respectively, using Equation (19).

Step 1050: Calculate $r_1$, $r_2$, ..., $r_N$ corresponding to $x_1$, $x_2$, ..., $x_N$, respectively, using Equation (16).

Step 1055: Calculate $i_1$, $i_2$, ..., $i_N$ corresponding to $x_1$, $x_2$, ..., $x_N$, respectively, using Equation (21) along with $\lambda_1$, $\lambda_2$, ..., $\lambda_N$ and $r_1$, $r_2$, ..., $r_N$.

Step 1060: Calculate D using Equation (25). If N=2, then Equation (25) is used directly. If N=3 then Equation (25) is applied to each pair of identified positions from $x_1$, $x_2$, ..., $x_N$; e.g., if N=3, apply equation (25) to $x_1$ and $x_2$, $x_1$ and $x_3$, and $x_2$ and $x_3$ so as to obtain three values of D: $D_1$, $D_2$, and $D_3$. For the N=3 case, calculate the mean value of D (labeled as $D_{MEAN}$) and its standard error (S.E.) from $D_1$, $D_2$, and $D_3$ as is known to a person of ordinary skill in the art of statistics. The same statistical approach could be applied for any other value of N that exceeds 3 as is known to one of ordinary skill in the art of statistics. It is noted that the standard error decreases as N increases. The preceding explanation of how the mean value of D may be calculated is merely exemplary. Any statistical approach for calculating the mean value of D (or any other statistically averaged value of D), as would be known to a person of ordinary skill in the art of statistics, is within the scope of the present invention. Similarly, the mean value of D (or any other statistically averaged value of D) is subject to a statistical error that decreases as N increases. For example, the standard error (S.E.), discussed supra, is an example of such a statistical error associated with the mean value of D (or any other statistically averaged value of D).

Step 1065: The calculated range (D or $D_{MEAN}$ for N=2 and N>2, respectively) and any other desired quantities may be printed out. Such desired quantities may include, inter alia, any or all of: S.E. (if N>2), $(x_1, x_2, \ldots, x_N)$, $(\lambda_1, \lambda_2, \ldots, \lambda_N)$, $(y_{\lambda 1}, y_{\lambda 2}, \ldots, y_{\lambda N})$, $(r_1, r_2, \ldots, r_N)$, $(i_1, i_2, \ldots, i_N)$, etc.

As stated supra, steps 1010 and 1015 remove ambient illumination from the readings and are typically executed only once.

In step 1040, the taking of wave lengths, is not elaborated upon here, because there are many methods for taking a wave length from a sensor having several discrete wave length stimuli. Typical video cameras have red, green and blue tri-stimulus sensors based on human vision, but it is possible to obtain intermediate wave lengths from any two color sensors at the extrema of a wavelength band. For example, red and blue detectors with overlapping sensitivities can accommodate an intermediary calculation of green. Colorimetry is a practiced art with its own technical literature. We do observe that the target beacon color temperature should be known for the relative balance between primaries to be calculated with greater accuracy.

Step 1060 points to statistical methods that can increase the sensitivity of the range finder. Sampling with a red, green and blue sensor array having 12 bit sensitivity in each color will in and of itself result in a theoretical resolution in D of 36 bits. However, there is always noise in such systems. The oversampling afforded by the alternate readings suggests that the range finder will enjoy noise immunity if the steps above are followed for all marked readings and not merely the minimum of two. Some linear array photo detectors have over 12,000 photo sites per color. If all readings at all sites were used, oversampling would have a dramatic effect on improving signal to noise in the embodiment of FIGS. 5–7.

The model of a chromatic range finder in FIG. 3 is a compact unit capable of making rapid and accurate profile measurements. The configuration of projector 310, grating 340 and sensor (e.g., camera) 350 bear a resemblance to the optics inside a common desktop scanner, and the use of color linear array 324 as the sensor furthers the comparison. To affect a plurality of profile scans, the primary elements of projector, grating and sensor can be moved along a track in a linear direction perpendicular the plane of the sheet of light. Such an embodiment would permit the scanning of surfaces.

The present invention of a chromatic range finder has considerable advantages over previously disclosed diffraction range finders. The receiver can be a linear sensor array rather than a two dimensional array. Linear arrays are more accurate in their measured parameters and lower in cost than two dimensional sensors. Readings made by the chromatic method do not require scanning of dark pixels between monochromatic higher-order images, and the proportional increase in rate of acquisition of range data can match the so-called "real time" scan rates of conventional video signals. As a beacon target recedes in distance so the spectral spread captured by the receiver expands over a greater portion of its sensor sites thereby increasing the sampled data in proportion to distance. This proportional expansion of data sites counteracts the effects of perspective foreshortening which causes loss of accuracy with distance. The plurality of ray paths over the broad spectrum also provides occlusion immunity, because any two colors from any of the many possible angles of incidence are sufficient to make a range reading.

The present invention has broad commercial applications. These include such devices as real time 3D scanners of human figures and faces for subsequent processing and display by computers. The beacon target can be adapted for use as a non-contact pointing device to control the position of a display cursor. Following the teaching given herein, specification of a relationship between chromatic dispersion sampled in the receiver with target distance will allow those persons practiced in the art to tailor chromatic range finders to the explicit demands of their usage. Improvements in performance will be found in a variety of parameters including but not limited to the rate of acquisition, accuracy and resolution, the stand-off of the range finder to the target, the overall target range, and the allowable shape of the range finding instrument.

While the embodiments presented herein illustrated the broadband radiation transmitted by a target as electromagnetic radiation, all forms of broadband radiation transmitted by the target are within the scope of the present invention. Such broadband radiation other than broadband electromagnetic radiation include, inter alia, mechanical waves (e.g., acoustic waves), electron waves, etc., which are characterized by the transmission of energy propagated through periodic waves.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for determining range by correlating a relationship between one or more distances of a diffraction grating from an illuminated target surface with variations in the respective wavelengths of high order diffraction spectra as observed through said grating, said high order diffraction spectra being derived from broadband radiation transmitted from said illuminated target surface.

2. The method of claim 1, wherein said illuminated target surface is comprised by a target such that the target is an original source of said broadband radiation.

3. The method of claim 1, wherein said illuminated target surface has received said broadband radiation from an external source.

4. The method of claim 3, wherein the target surface falls within a plane of a sheet of light generated by the external source.

5. The method of claim 1, wherein the position of the diffraction grating relative to the illuminated target surface is unknown along a direction that is parallel to the long dimension of the diffraction grating, and wherein said correlating comprises using at least two of said wavelengths.

6. The method of claim 5, wherein using at least two of said wavelengths comprises using at least N of said wavelengths such that N is at least 3, and further comprising calculating said distances as a statistically averaged value subject to a statistical error that decreases as N increases.

7. The method of claim 1, wherein the diffraction grating is a transmission diffraction grating.

8. The method of claim 1, wherein the diffraction grating is a reflection diffraction grating.

9. The method of claim 1, further comprising recording the observed diffraction pattern on a recording medium.

10. The method of claim 9, wherein the recording medium comprises a focal plane of a camera.

11. The method of claim 1, wherein said diffraction spectra are electromagnetic diffraction spectra.

12. The method of claim 1, wherein said diffraction spectra are mechanical-wave diffraction spectra.

13. The method of claim 1, wherein said correlating includes adjusting for readings of ambient color intensities.

14. The method of claim 1, wherein said correlating includes adjusting for readings of target surface color intensities.

* * * * *